United States Patent [19]

Loh et al.

[11] Patent Number: 4,626,473

[45] Date of Patent: Dec. 2, 1986

[54] THERMAL ENERGY STORAGE POWDERED MATERIAL

[75] Inventors: Ih-Houng Loh, Cambridge; Robert E. Cohen, Jamaica Plain; Raymond F. Baddour, Belmont, all of Mass.

[73] Assignee: Massachusetts Institute of Technology, Cambridge, Mass.

[21] Appl. No.: 725,618

[22] Filed: Apr. 22, 1985

[51] Int. Cl.$^4$ .................................................. C08J 3/04
[52] U.S. Cl. ...................................... 428/409; 427/34; 427/38; 428/402
[58] Field of Search .............................. 428/402, 409; 525/326.1; 427/34, 38

[56] References Cited

U.S. PATENT DOCUMENTS

| | | | |
|---|---|---|---|
| 3,969,547 | 7/1976 | Isawa et al. | 427/214 |
| 3,988,296 | 10/1976 | Bethea et al. | 260/45.75 B |
| 4,029,862 | 6/1977 | Liu et al. | 526/43 |
| 4,035,560 | 7/1977 | Caumartin et al. | 526/124 |
| 4,166,167 | 8/1979 | Eye et al. | 526/142 |
| 4,182,398 | 1/1980 | Salyer et al. | 165/1 |
| 4,264,750 | 4/1981 | Anand et al. | 525/536 |
| 4,268,579 | 5/1981 | Suzuki et al. | 428/413 |
| 4,314,053 | 2/1982 | Lin et al. | 528/483 |
| 4,404,256 | 9/1983 | Anand et al. | 428/409 |
| 4,414,351 | 11/1983 | Suzuki et al. | 524/413 |
| 4,420,609 | 12/1983 | Lin et al. | 524/486 |
| 4,426,465 | 1/1984 | Maki et al. | 523/135 |
| 4,508,781 | 4/1985 | Yagi et al. | 428/409 |

FOREIGN PATENT DOCUMENTS

DE3321905A 12/1983 Fed. Rep. of Germany .

OTHER PUBLICATIONS

Polymer Engineering & Science, Sep. 1975, vol. 15, pp. 673-678, Kaelble et al.
Industrial Chemical News, "Fabrics", Sep. 1984.
Chemical Week, Aug. 1, 1984, pp. 22-23.
Polymer Engineering & Science, Nov. 1984, pp. 1227-1231, Boneh et al.

Primary Examiner—Allan M. Lieberman
Attorney, Agent, or Firm—Paul J. Cook

[57] ABSTRACT

Thermal storage energy powders are formed from polyolefin particles having their surfaces crosslinked in a cold plasma. The crosslinked surfaces have a heat of fusion substantially identical to the uncrosslinked portion of the particles.

6 Claims, 1 Drawing Figure

THERMAL ENERGY STORAGE POWDERED MATERIAL

The Government has rights in this invention pursuant to Grant Number CPE-8025302 awarded by the National Science Foundation.

BACKGROUND OF THE INVENTION

The present invention relates to a powder capable of being used as a thermal energy storage material.

Certain polymeric materials have been examined in the prior art for thermal energy storage for home heating and cooling applications. A candidate material is a lightly cross-linked high density polyethylene in the form of pellets. The crosslinking is necessary to prevent the pellets from sticking together when heated above the melting point.

The following three methods of controlled chemical crosslinking of high density polyethylene have been reported in Salyer, I. O. and Davison, J. E., "Thermal-Energy Storage in Crosslinked Pellets of High-Density Polyethylene for Home Heating and Cooling via Off-Peak Electric Power Utilization", J. Appl. Poly. Sci., 28, 2903, 1983. The first method relates to peroxide-initiated, free radical crosslinking. The second and third methods, respectively, relate to vinyl triethoxy silane grafting crosslinking and electron beam crosslinking. In all of these cases, the crosslinks eliminate the melt flow which is desirable for high-temperature form stability. However, undesirably, these processes decrease crystallinity and heat of fusion which is highly desirable for thermal energy storage. All three methods of crosslinking were reported to result in losses of up to thirty percent of the initial heat of fusion.

Heretofore, crosslinking particles of high density polyethylene has resulted in a considerable loss in the heat of fusion as compared to the uncrosslinked particles. Thus, the thermal efficiency of a thermal energy storage system using such particles is undesirably reduced.

SUMMARY OF THE INVENTION

The polyolefin thermal energy storage of the present invention retains essentially the identical initial heat of fusion of an uncrosslinked polymer while possessing the desirable non-sticking properties of the crosslinked polymer. The process of the present invention results in an entire surface portion of powder particles being crosslinked with an inconsequential effect on the desirable heat of fusion properties. Thus, the desirable thermal efficiency of a thermal energy storage system using such particles is retained.

According to the present invention, a thermal energy storage material comprises a powder consisting essentially of particles of a polyolefin. The powder has substantially the entire surface portions of substantially all of the particles crosslinked to prevent fusing of said particles to each other at relatively high temperatures utilized for thermal energy storage. The heat of fusion of the particles is substantially identical to the particles of a polyolefin prior to surface crosslinking.

Also, in accordance with another aspect of the present invention, there is provided a process for preparing a thermal energy storage material comprising contacting particles consisting essentially of a polyolefin with an inert gaseous medium for crosslinking substantially the entire surface portion of substantially all of the particles and forming surface crosslinked particles for thermal energy storage. The crosslinking is sufficient to prevent fusing of the particles to each other at relatively high temperatures utilized for thermal energy storage and the suface crosslinked particles have a heat of fusion substantially identical to the particles of the polyolefin prior to surface crosslinking.

Further, there is provided an apparatus for preparing a thermal energy storage material comprising means for contacting polymer particles with a gaseous medium in a fluidized bed for modifying all of the particles and forming surface modified particles. The contacting means comprises a vessel mounted for rotation along an axial direction which has an inlet and an outlet at respective axial ends for the flow of gaseous medium. An induction coil surrounds the vessel to provide a radio frequency discharge sufficient to form a plasma from the gaseous medium.

IN THE DRAWINGS

FIG. 1 is a schematic view of the apparatus used for preparing a thermal energy storage material of the present invention.

DETAILED DESCRIPTION

Figure 1:
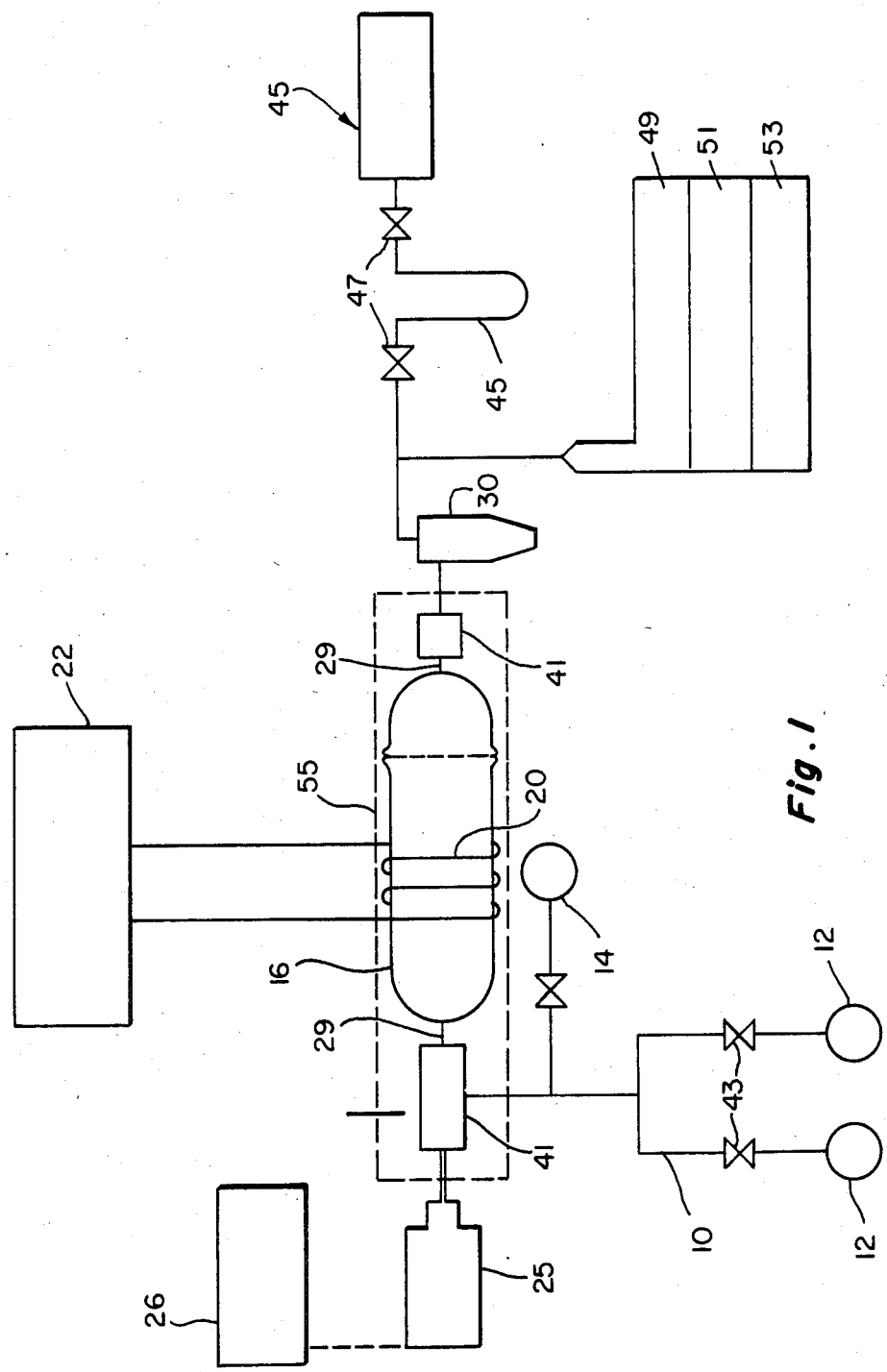

The treated thermal energy storage powder of the present invention has physical characteristics of the powder particle substantially identical to the untreated starting powder as hereinafter described. The treatment crosslinks the surface of the particles only to a depth which does not affect the favorable thermal energy storage properties which remain substantially identical to the untreated starting powder. More particularly, the heat of fusion is substantially identical to the untreated powder particles even though the treated particles have substantially the entire surface crosslinked. The crosslinking is at a depth less than about 1000° A and preferably within the range of from about 50° A to about 100° A.

The starting powders of the present invention comprise a dense, free flowing non-porous polyolefin polymer or copolymer. The term "polyolefin" is used to denote polymers of ethylene, propylene and butylene and copolymers thereof. Polyethylene polymers, for example, have absolute densities of from about 0.95 to about 0.97 grams per cubic centimeter and melting points of from about 120° C. to about 135° C. Preferred powders comprise a loosely packed bed wherein the particle diameter is greater than about 10 microns. Most preferably the particles are substantially spherically shaped. The particles of the powder typically have a diameter of about 0.1 millimeter. Typicallly, polyethylene has a heat of fusion from about 44 to about 58 calories per gram.

The apparatus used according to the process of the present invention to prepare powders is schematically shown in FIG. 1. As shown in the figure, a gas is supplied to conduit 10 which includes mass flow meters 12 and a capacitance manometer 14. The gas mixture enters rotating vacuum seal 41 and reaction chamber 16 which is surrounded by an induction coil 20. A radio frequency generator 22 is connected to induction coil 20. The reaction chamber 16 is rotated about an axis by a motor 25 along the axial direction; motor speed is regulated by controller 26. The axial rotation of the reaction chamber 16 causes the polymeric particles to loosely tumble within the chamber during the crosslinking reaction . The inlet 27 and outlet 29 are respective axial ends for the flow of the gaseous medium. Preferably, the reaction chamber 16 includes an internal baffle or internally protruding surface to promote mixing and contact of the gaseous medium with the surface of the particles. The particles exit outlet 29 and pass into cyclone 30 where they are recovered. According to a preferred process, the apparatus may be modified to provide a continuous process by providing an additional inlet and outlet for the flow of powder. The untreated powder enters the inlet, flows countercurrent to the gaseous medium and exits the outlet.

According to the process of the present invention, the starting polyethylene particles are treated with a relatively cold plasma gaseous medium for a sufficient period of time to modify substantially the entire surface of the particles. The cold plasma used here is generally characterized as a "glow discharge" and classified by the electron energy and density. Typically, the average electron energy is on the order of 1 to 10 ev and the electron density is in the range of $10^9$ to $10^{12}$ cm$^{-3}$. The corresponding Debye length, a measure of the distance over which a charge separation can occur, is about 0.01 cm. Additionally, such a plasma lacks equilibrium between the electron temperature Te and the gas temperature Tg. The ratios for Te/Tg lie in the range 10 to $10^2$. This lack of thermal equilibrium can provide a plasma in which the electron energies are sufficiently high to rupture molecular bonds and kinetically cause other transformations. The gas temperature of the plasma during the surface modification reaction is preferably from about 25° to about 80° C. It has generally been observed that exposure of polymers to an activated inert gas plasma results in extensive crosslinking on the polymer surface layer. Both the ultraviolet radiation and reactive radicals in the plasma are capable of generating free radicals on the surfaces of many polymers which lead to the formation of crosslinks in the outermost surface. It is important that the thickness and integrity of the crosslinked layer be large enough to retain the melt polymer within its shell when the temperature is raised above the melting point. Development of a surface crosslinked layer has been shown to be related to the length of plasma exposure, the choice of the plasma conditions and the nature of the polymer. The residence time is preferably from about 30 to about 90 minutes, and more preferably from about 50 to about 70 minutes. Longer times are undesirable because no substantial benefits are obtained thereby. Shorter times are undesirable because the depth of reaction is too small. The inert gas plasmas provide only the crosslinked layers on the polymer surfaces. However, the fluorinating gas plasmas provide not only the crosslinked layers but also fluorinated surfaces. The fluorinated surface has properties of low surface energy which will be non-sticking and non-wettable. Particles with these properties will have less probability to contact each other and hence retain their desirable shape and particular distribution in a fluid for thermal energy storage.

A cold plasma can be generated by conventionally available means such as radio frequency excitation, microwave excitation or with electrodes. Suitable plasmas can be formed with a radio frequency discharge operating between about 10 kilohertz and 20 megahertz and about 10 to 500 watts or with a microwave discharge operating between about 10,000 to 1,000,000 megahertz and about 10 to 500 watts. These wattage considerations are based upon a 6 inch diameter reactor and may be increased for a larger reactor. The glow discharge utilized herein is fundamentally different from corona or arcing discharges which occur at higher pressures than employed in this invention. Thus, the cold plasma utilized herein effects surface changes under much milder conditions as compared to corona or arcing discharges.

According to the present invention, the gaseous medium is an inert gas capable of generating free radicals on the surface of the polyethylene powder particles when present as a cold plasma. The free radical generation should be sufficient to only result in the crosslinking of the surface. Typical inert gases include helium, argon, krypton, neon and xenon. Helium and argon are the preferred inert gases. Inert means that plasma gas components do not become involved in polymer surface reaction. The inert plasmas are usually regarded as physical processes in which energetic ions, though unable to react chemically with the polymer surface, can impart kinetic energy and momentum to eject surface atoms from the surface. The mechanism for surface crosslinking is the production of reactive sites within the polymer by the inert plasma, which then react with adjacent chains to produce a network structure. The crosslinking reactions result in the replacement of a carbon to carbon double bond with two carbon to carbon single bonds but does not change the chemical composition.

The following example illustrates the present invention and is not intended to limit the same.

EXAMPLE I

The apparatus utilized in this example is as shown in FIG. 1. The Pyrex tubular reactor which includes rotating vacuum seals on either end is separable into two parts to permit loading of the starting powder. Rotation of the reactor is performed by a variable speed gear motor (Bodine, Model 42D 5BEPM-53) with a variable speed control (Minarik Model SLF68) capable of rotating the reactor at speeds of from 2 to 50 rmp. The interior wall of reactor 16 is dimpled at several points around the interior periphery to promote mixing of the powder. The reactor includes rotating vacuum seals constructed of brass, teflon and nylon to permit the passage of a gaseous medium through the reactor in the axial direction during rotation. Inlet gases are passed through mass flowmeters (Hasting-Raydist, Model Nall 100 and LF 50) and micrometer needle valves before being admitted to the reactor. The exiting exhaust gases are passed through liquid nitrogen trap and then to a vacuum pump. The system pressure is regulated by constricting the downstream vacuum valves and is monitored by an absolute capacitance manometer before and after the reactor. The reactor is positioned interior to an axial aligned electrical coil which has copper coil windings surrounding the periphery of the reactor. The coil, which is connected to a 13.56 MHz R. F. generator (LFE Corp.) by a shielded coaxial cable, creates a cold plasma interior to the reactor. A UV-Visible emission spectrometer is used to analyze the plasma components and a quadrupole mass spectrometer is used for analyzing the mass range.

In the utilization of the apparatus, the starting powder is placed inside the reactor prior to evacuation. When the pressure drops to less than 0.1 torr, the reacting gas is admitted and allowed to flow for approximately ten minutes before turning on the generator to form the plasma. The pressure as monitored by the capacitance manometer is on the order of 1 torr. Power supplied to the reactor typically is 20 to 200 watts. The reactions are carried out according to the conditions specified as to gas mixture, flow rates and reaction times. At the end of the reaction, the reactor is flushed with helium gas at 1 torr for 10 minutes and helium is slowly leaked into the reactor to bring the pressure up to atmospheric. The surface of the compositions was investigated by X-ray Photoelectron Spectroscopy by dusting the powders on a double-stick tape, which was then mounted on a glass slide for analysis.

Using the above apparatus and process, pure helium is used to treat a high density polyethylene powder free of additives having a 8.0 melt index, relatively narrow MWD and 0.965 g/cc density according to the following reaction conditions: reaction time of 60 min., temperature of 25° to 80° C., flow rate of 40 cc/min STP of gas.

The resulting powder after reaction is studied with ESCA. The spectrum indicates that except for a small percentage of oxygen which exists on the surface, the chemical composition is the same as for non-treated materials. The resulting powder showed no change in the melting point or the degree of crystallinity. The thermograms showed essentially no difference between the treated and the untreated powders.

We claim:

1. A thermal energy storage material comprising a powder consisting essentially of particles of a polyolefin, said powder having substantially the entire surface portions of substantially all of said particles crosslinked at a depth of less than 1000 Angstroms to prevent fusing of said particles to each other at relatively high temperatures utilized for thermal energy storage wherein the heat of fusion of said particles is substantially identical to said particles of said polyolefin prior to surface crosslinking.

2. A thermal energy storage material according to claim 1 wherein said power particles are substantially spherical.

3. A thermal energy storage material according to claim 1 or 2 wherein said power consists essentially of polyethylene polymer.

4. A process for preparing a thermal energy storage material comprising contacting particles consisting essentially of a polyolefin with an inert gaseous medium present as a cold plasma in a fluidized bed for crosslinking substantially the entire surface portion of substantially all of said particles and forming surface crosslinked particles at a depth less than 1000 Angstroms for thermal energy storage, said crosslinking being sufficient to prevent fusing of said particles to each other at relatively high temperatures utilized for thermal energy storage and said surface crosslinked particles having a heat of fusion substantially identical to said particles of said polyolefin prior to surface crosslinking.

5. A process for preparing a thermal energy storage material according to claim 4 wherein said inert gaseous medium consists essentially of helium, argon and mixtures thereof.

6. A process for preparing a thermal energy storage material according to claim 5 wherein said inert gaseous medium consists essentially of helium.

* * * * *